US012781526B2

(12) United States Patent
Spicer et al.

(10) Patent No.: US 12,781,526 B2
(45) Date of Patent: Nov. 3, 2026

(54) SPA COVER HAVING A WATER IMPERVIOUS COATING AND METHOD OF MANUFACTURING A SPA COVER

(71) Applicant: Strong Industries, Inc., Northumberland, PA (US)

(72) Inventors: Wade Spicer, Northumberland, PA (US); Charles Woods, West Manchester, OH (US)

(73) Assignee: Strong Industries, Inc., Northumberland, PA (US)

( * ) Notice: Subject to any disclaimer, the term of this patent is extended or adjusted under 35 U.S.C. 154(b) by 144 days.

(21) Appl. No.: 18/388,417

(22) Filed: Nov. 9, 2023

(65) Prior Publication Data

US 2024/0159071 A1 May 16, 2024

Related U.S. Application Data

(60) Provisional application No. 63/425,061, filed on Nov. 14, 2022.

(51) Int. Cl.
*E04H 4/10* (2006.01)
*C08L 25/06* (2006.01)
*C09D 175/04* (2006.01)

(52) U.S. Cl.
CPC ................ *E04H 4/10* (2013.01); *C08L 25/06* (2013.01); *C09D 175/04* (2013.01)

(58) Field of Classification Search
CPC .................................... E04H 4/10; E04H 4/08
See application file for complete search history.

(56) References Cited

U.S. PATENT DOCUMENTS 4,422,192 A * 12/1983 Jacobs ...................... E04H 4/08 4/496
4,857,374 A * 8/1989 Perry ...................... E04H 4/084 428/317.1
6,112,340 A * 9/2000 Ziebert ..................... E04H 4/08 4/498
10,941,581 B2 3/2021 Jensen
11,008,769 B2 * 5/2021 Elliott ...................... E04H 4/08
2005/0281999 A1 12/2005 Hofmann
2007/0245479 A1 10/2007 Schroeder et al.
2017/0260765 A1 * 9/2017 Spicer ................. B29C 44/1233
2021/0189750 A1 * 6/2021 Jensen .................... B32B 15/20

OTHER PUBLICATIONS

International Searching Authority; Notification of Transmittal of The International Search Report and the Written Opinion of the International Searching Authority, or the Declaration, Date: Jan. 31, 2024.

* cited by examiner

*Primary Examiner* — Janie M Loeppke
(74) *Attorney, Agent, or Firm* — Grogan, Tuccillo & Vanderleeden, LLP

(57) ABSTRACT

A cover for a spa includes a core, a water impervious coating in direct contact with the core, and a membrane encasing the core and water impervious coating.

7 Claims, 6 Drawing Sheets

SPA COVER HAVING A WATER IMPERVIOUS COATING AND METHOD OF MANUFACTURING A SPA COVER

CROSS-REFERENCE TO RELATED APPLICATIONS

This application claims the benefit of U.S. Provisional Application Ser. No. 63/425,061, filed on Nov. 14, 2022, which is hereby incorporated by reference herein in its entirety.

FIELD OF THE INVENTION

The present invention relates generally to spas and, more particularly, to a cover for a spa and method of manufacturing a cover for a spa.

BACKGROUND OF THE INVENTION

Spas, also commonly known as hot tubs, are popular fixtures that are used in many homes. They generally include a deep, vacuum formed tub having a smooth acrylic liner that is filled with heated water and which is used for soaking and relaxation. Spas typically include water jets for massage purposes.

Typically, the acrylic liner is formed into shapes that provide a variety of seating arrangements within the tub. Each seat is usually equipped with hydrotherapy jets that allow a pressurized flow of water to be directed at various parts of a user's body. The water flow may be aerated for additional effect, and some or all of the jets may also automatically move or rotate, causing the changing pressure of the water on the body to provide a massage-like effect.

Because many spas/hot tubs are located outdoors, they are often equipped with covers for enclosing the tub when not in use. These covers help prevent dirt, leaves and other debris from entering the water, and provide a safety function by preventing children and animals from falling into the water. Moreover, spa covers are often insulated so as to limit heat loss from the water when the spa is not in use for purposes of energy efficiency and readiness of use.

As will be readily appreciated, however, existing covers for spas are heavy and cumbersome, making them difficult for a user to remove prior to using the spa and to place back over the spa when it is no longer in use. Lighter, foam-core covers are often not vey structurally sounds, and can become waterlogged over time.

In view of the above, there remains a need for a cover for a spa that is water impervious.

SUMMARY OF THE INVENTION

It is an object of the present invention to provide a spa cover.

It is another object of the present invention to provide a spa cover having a water impervious coating.

These and other objects are achieved by the present invention.

According to an embodiment of the present invention, a cover for a spa includes a core, a hydrophobic coating encasing the core, and a membrane encasing the core and hydrophobic coating.

According to another embodiment of the invention, a method of manufacturing a cover for a spa includes the steps of providing a core and encasing the core with a hydrophobic coating.

According to yet another embodiment of the present invention, a cover for a spa includes a core having a cellular structure, a hydrophobic spray coating encasing the core, and a flexible membrane and/or a hard shell encasing the core and coating.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
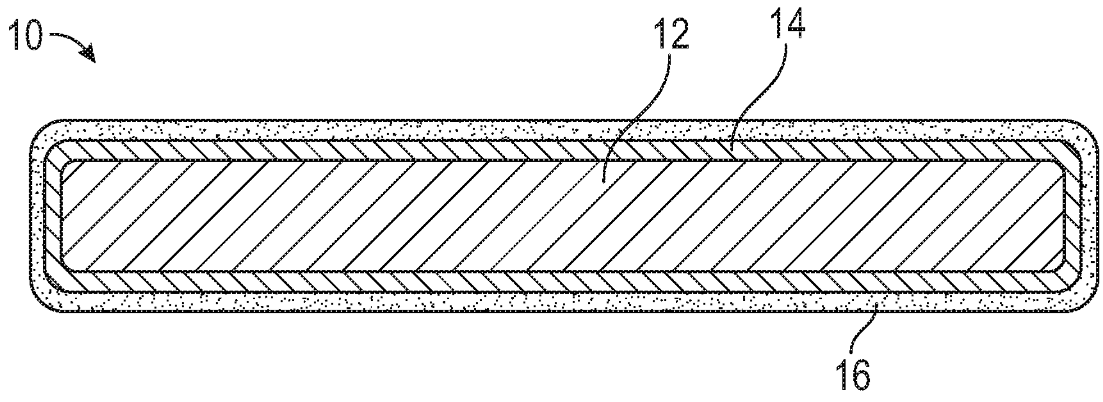
FIG. 1 is cross-sectional view of a spa cover according to an embodiment of the present invention.

Referring to FIG. 1, a spa cover 10 according to an embodiment of the present invention is illustrated. In an embodiment, the cover 10 includes core 12, a coating 14 applied over the core 12, and a skin or cover member/membrane 16 that encases the core 12 and coating 14. In an embodiment, the core 12 is manufactured from expanded polystyrene (EPS) although other materials known in the art may also be utilized without departing from the broader aspects of the invention. In other embodiments, the core 12 may be a polyurethane foam or cellular or multiwall material formed from acrylic, Lexan and/or other material, as discussed hereinafter. Other materials are also possible.

Figure 2:
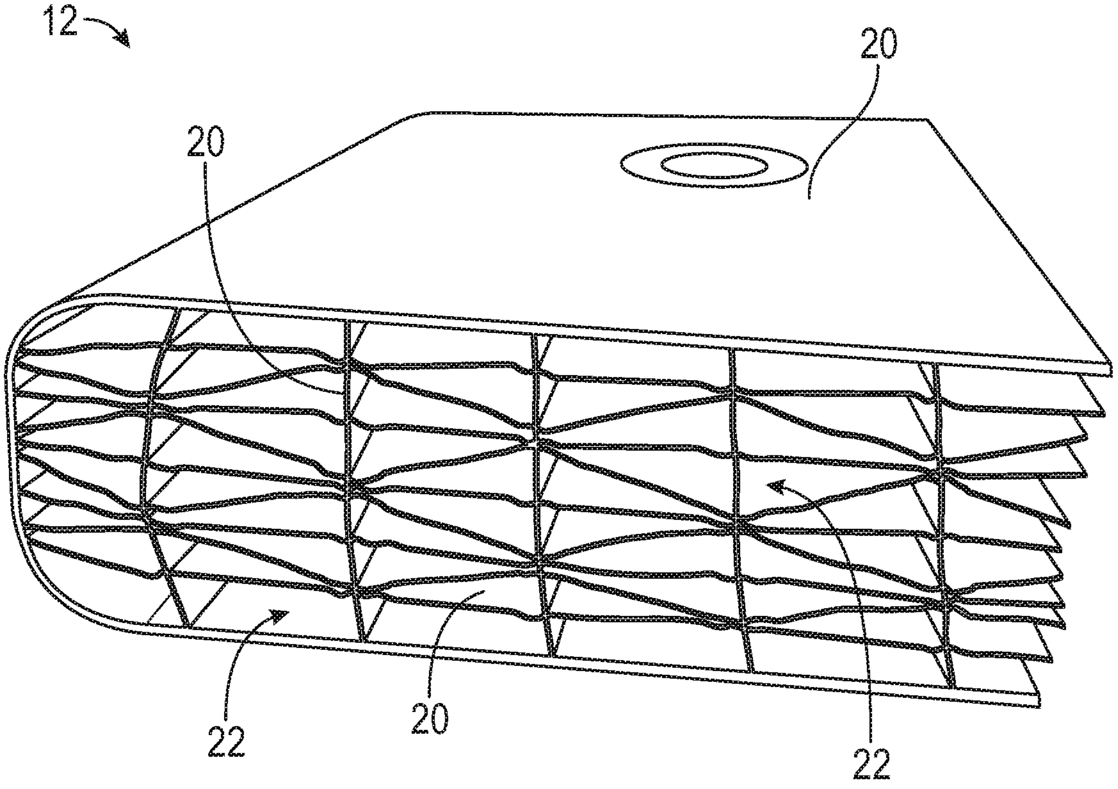
FIG. 2 is a perspective view of a core of a spa cover according to an embodiment of the invention.
Figure 3:
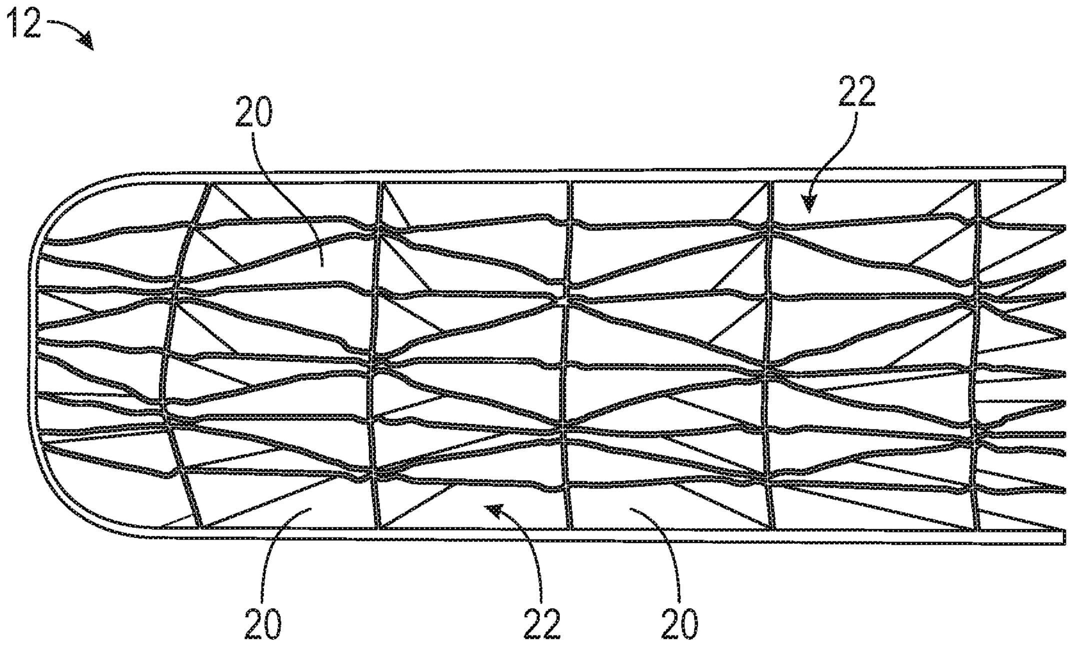
FIG. 3 is an end view of the core of a spa cover of FIG. 2.

For example, with reference to FIGS. 2 and 3, core 12 is shown in the form of cellular or multiwall structure. In such embodiments, the core 12 includes a plurality of walls or structural members 20 separated by a plurality of voids 22. The walls 20 may be rigid or flexible. In an embodiment, the cellular structure of the core may be characterized by a porous microstructure that is comprised of solid and void networks. The core 12 may have a honeycomb structure.

In an embodiment, the coating 14 is a water impervious (or substantially water impervious), or hydrophobic coating and may be, for example, a urea or polyurethane hydrophobic coating. In an embodiment, the coating is a two-part polyurethane coating. In one embodiment, the coating 14 is a spray-on elastomeric protective coating, such as the coating manufactured and sold under the trade name Bullet Liner RPM from Accella. In another embodiment, the coating is a polyurea or pure urea spray elastomer such as the coating manufactured and sold under the trade name Intellathane 7100LV by Carlisle Polyurethane Systems.

In an embodiment, a block of EPS material is first formed to shape by processes known in the art such as by cutting, shaving, sanding, and the like, to form core 12. In an embodiment, the coating 14 is then applied directly to the core 12 (regardless of construction/composition) via spraying. In an embodiment, the coating is applied to a thickness of 0.015 to 0.030 inches to sea the core 12 from moisture intrusion. The coating is then allowed to dry. Importantly, the coating 14 substantially encases the core 12 and makes it stronger and prevents water from contacting the core 12. The core with impervious coating 14 is then wrapped in or otherwise covered by a skin or membrane 16. In an embodiment, the skin or membrane 16 may be formed from any material known in the art such as vinyl or the like. In an embodiment, the skin or membrane 16 may be formed from acrylic and/or ABS, polyethylene or other materials, and may be formed or deposited by vacuum forming, drape molding, blow molding, or the like. In an embodiment, the membrane 16 is a decorative or aesthetically-pleasing covering. In an embodiment, the membrane 16 may be omitted such that the coating 14 forms the outermost layer of the cover 10.

While the present invention discloses that the coating 14 is applied directly to the foam core 12 by spraying, it is not intended that the present invention be so limited in this regard. In particular, it is contemplated that the coating 14 may be applied directly to the foam core 12 by immersion coating, roll coating, and the like, or by any of the other techniques disclosed herein.

The cover 10 may then be further modified or adapted to enable use of the cover with a lift assembly for a spa, such as disclosed in U.S. Pat. No. 10,865,579, which is hereby incorporated by reference herein in its entirety.

Figure 4:
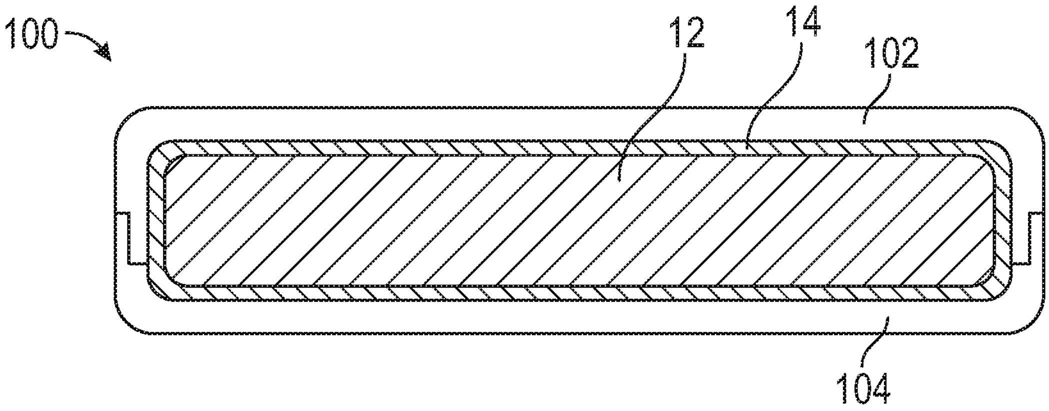
FIG. 4 is a cross-sectional view of a spa cover according to another embodiment of the present invention.

In an embodiment, the coating 14 is intended to be used on both hard covers and soft covers. For example, with reference to FIG. 4, a spa cover 100 according to another embodiment of the present invention is shown. The spa cover 100 includes a core 12 and water impervious coating 14 encasing the core 12, as disclosed above. In an embodiment, the core 12 and coating 14 may be encased within a membrane of the type disclosed above (although not shown in FIG. 4). The cover 100 further includes rigid or substantially rigid upper and lower cover members 102, 104 defining an interior space within which the core 12 is housed. In particular, the core 12 is received within the interior space and the cover members 102, 104 are brought into nesting relationship to enclose the core 12. In an embodiment, the cover members 102, 104 may take the configuration as disclosed in U.S. Pat. No. 10,533,334, which is hereby incorporated by reference herein in its entirety.

In an embodiment, the cover members 102, 104 are manufactured from an acrylic material. For example, in the preferred embodiment, the cover members 102, 104 may be manufactured from one of acrylonitrile butadiene styrene (ABS) and polyvinyl chloride (PVC). In other embodiments, the cover members 102, 104 may be manufactured from other materials such as, for example, polyethylene (PE), without departing from the broader aspects of the present invention. In an embodiment, the cover members 102, 104 may be joined together with an adhesive and/or include cooperative locking features to inhibit decoupling of the cover members 102, 104, once joined.

For example, in an embodiment, manufacturing the cover 100 includes first cutting an EPS foam core 12 to shape (to correspond closely to the shape and interior dimensions of top and bottom cover members 102, 104). As disclosed above, however, the core can take any form known in the art. The core 12 is then sprayed with a water impervious coating 14 such as, for example, Intellathane 7100LV by Carlisle Polyurethane Systems, although other coatings of the type disclosed above may also be utilized without departing from the broader aspects of the invention. In an embodiment, the water impervious coating is applied to a thickness of 0.015 to 0.030 inches to seal the foam core from moisture intrusion inside of the hard cover shell. The coating 14 is then allowed to dry. The inside surfaces of one or both of the rigid shell members 102, 104 are then sprayed with an adhesive such as, for example, Intellathane SL-50 by Carlisle Polyurethane Systems, which provides for a slower set-up time of about 20 seconds. Other urethane adhesives may also be utilized. The coated EPS core 12 with coating 14 is then inserted into the interior space of the shell members 102, 104 so that it is in contact with the adhesive on the interior surfaces of the shell members 102, 104. The SL-50 adhesive binds the core 12 to the shell member(s) 102, 104 and provides a thermal set glue and rigidizer that will not melt under the high temperatures that the cover 100 may see in direct sunlight.

Figure 5:
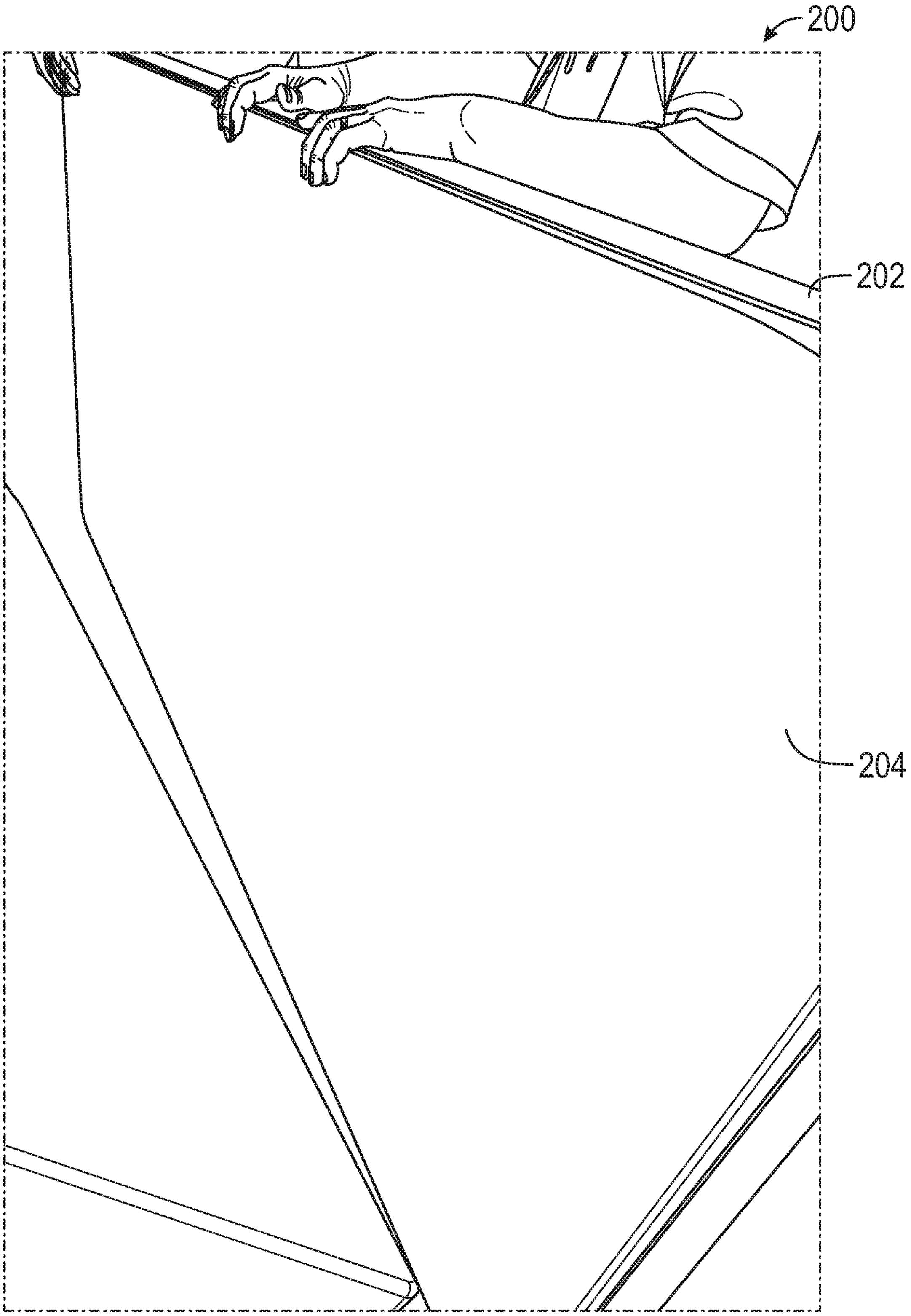
FIG. 5 is a perspective view of a spa cover according to another embodiment of the present invention.
Figure 6:
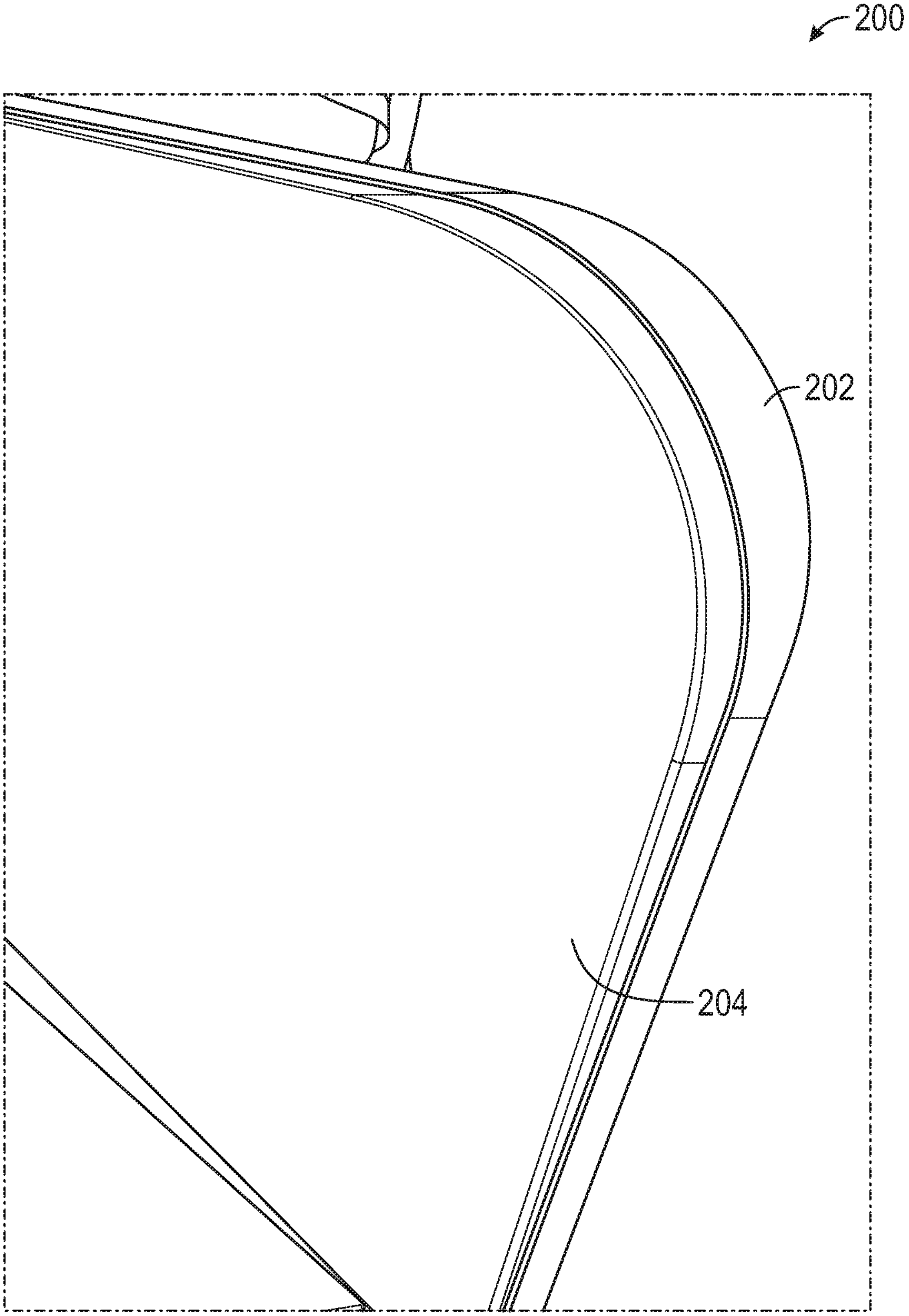
FIG. 6 is an enlarged, perspective view of the spa cover of FIG. 5.

Turning now to FIGS. 5 and 6, a spa cover 200 according to yet another embodiment of the present invention is shown. As illustrated, the spa cover 200 includes a rigid or substantially rigid upper/top cover member 202 (which may be the same or similar to cover member 102 disclosed above). The spa cover 200 further includes a core 204 having a water impervious coating (as disclosed above) affixed to the interior walls of the cover member 202 via an adhesive. As illustrated, therefore, the top of the cover 200 is formed by the rigid shell member 202, while the bottom/underside of the cover 200 is formed by the foam core 204 with water impervious coating.

In an embodiment, manufacturing the cover 200 includes first cutting an EPS foam core 204 to shape (to correspond closely to the shape and interior dimensions of top cover member 202). As disclosed above, however, the core can take any form known in the art. The core 204 is then sprayed with a water impervious coating such as, for example, Intellathane 7100LV by Carlisle Polyurethane Systems, although other coatings of the type disclosed above may also be utilized without departing from the broader aspects of the invention. In an embodiment, the water impervious coating is applied to a thickness of 0.015 to 0.030 inches, and more preferably about 0.030 inches, to seal the foam core from moisture intrusion inside of the hard cover shell 202. The coating is then allowed to dry. The inside surfaces of the rigid shell member 202 are then sprayed with an adhesive such as, for example, Intellathane SL-50 by Carlisle Polyurethane Systems, which provides for a slower set-up time of about 20 seconds. The coated EPS core 204 is then inserted into the interior space of the shell member 202 so that it is in contact with the adhesive on the interior surfaces of the shell member 202. After curing, the core 204 is adhered/affixed to the shell member 202.

In an embodiment, after coating the foam core to a thickness of about 0.030 inches and prior to joining the core to the cover member 202, a pattern is created on the bottom surface of the core in the coating. In an embodiment, the pattern is a decorative pattern which may match a pattern formed on an exterior surface of the top shell member 202. Importantly, this improves the aesthetics of the cover 200, which has the coated foam core 204 as the exposed bottom surface of the cover 200.

Importantly, it has been discovered that the cover 200 is substantially water impervious, provides optimal rigidity and is relatively immune from damage or caving, and can be manufactured at a lower cost and more quickly than typical spa hardcovers that have heretofore required rigid material to form the entirety of the cover.

Figure 7:
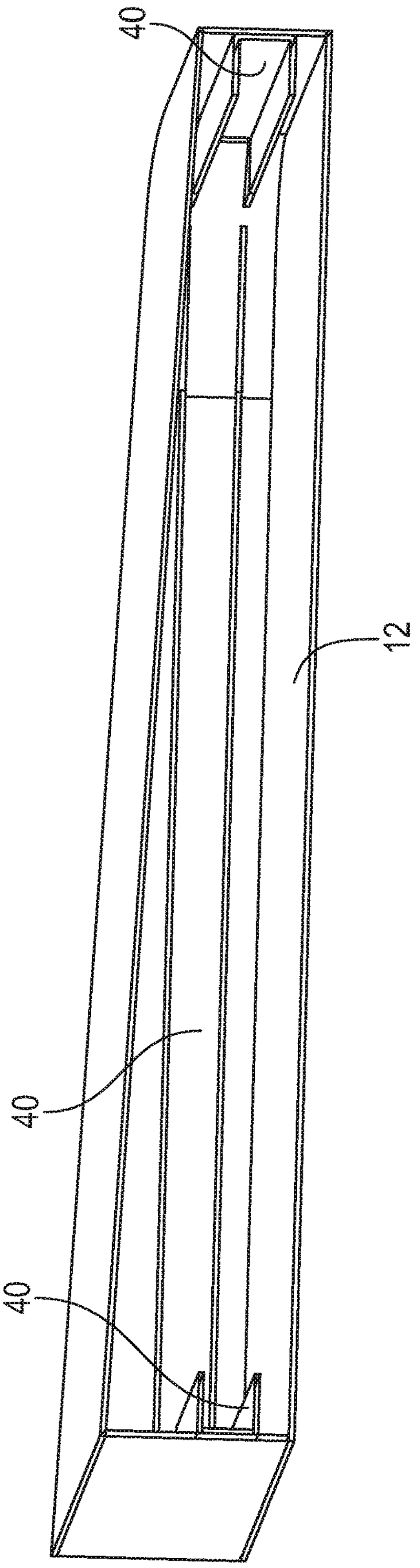
FIG. 7 is a cross-sectional, perspective view of a spa cover according to another embodiment of the present invention.
Figure 8:
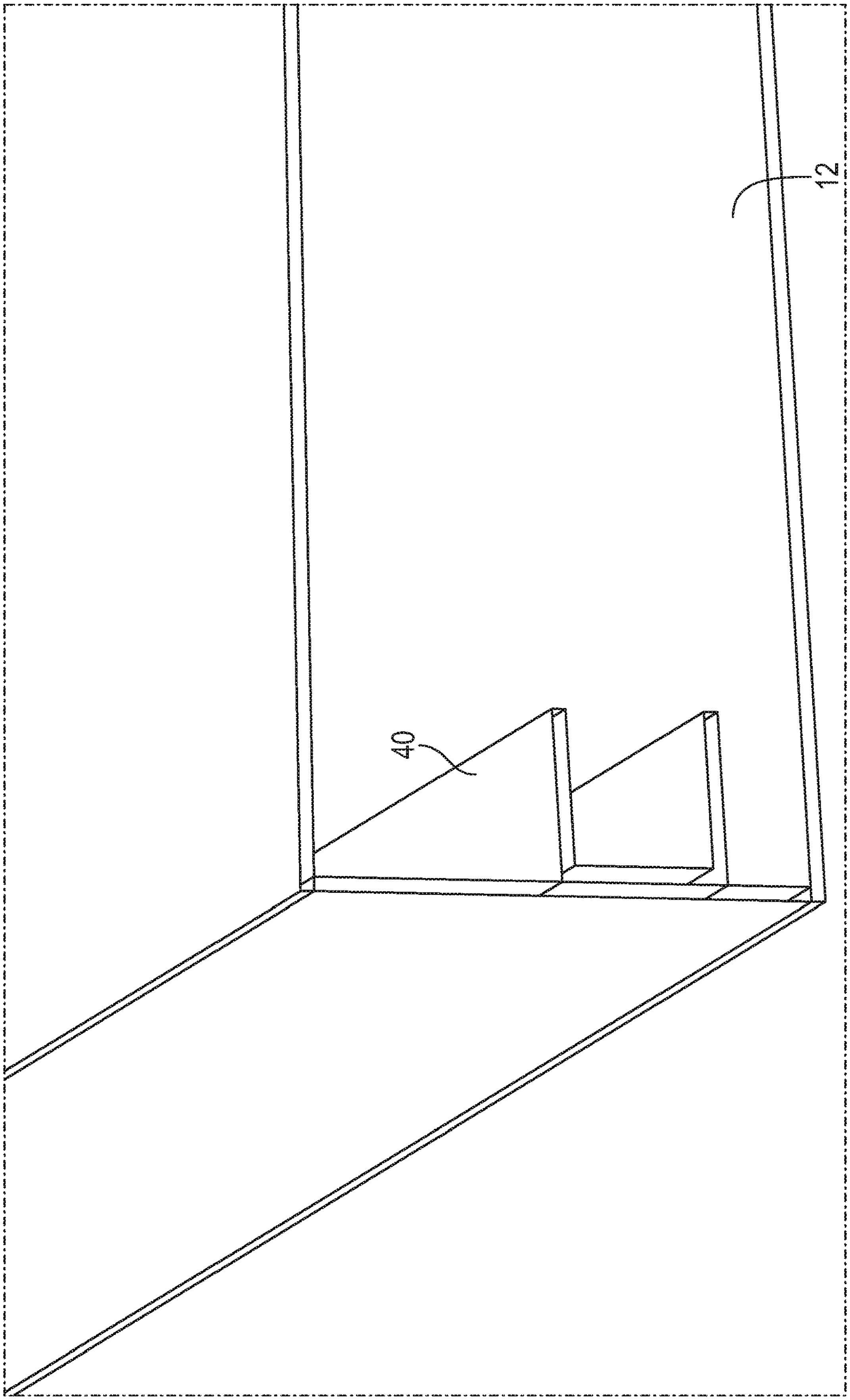
FIG. 8 is an enlarged, cross-sectional, perspective view of the spa cover of FIG. 7.

Turning finally to FIGS. 7 and 8, in an embodiment, the core 12 may include a structural member 40 that is embedded in each lateral side of the core 12 (e.g., a structural member 40 embedded in the EPS foam). In an embodiment, the structural member 40 is a C-channel, although other rigid structural members/shapes such as I-beam, Z-shape, HSS-Shape, Angle, Tee, bar, rod, and plate type structural members may also be utilized without departing from the broader aspects of the invention. In the preferred embodiment, the structural member 40 extends along substantially an entire perimeter of the core 12. In other embodiments, however, the structural member 40 may be located in less than all sides of the core 12, only in the corners, etc. It is contemplated that the structural member may be formed from aluminum, steel or ABS, although other materials known in the art may also be utilized. It is contemplated that the structural members 40 are particularly suitable for embodiments which employ a foam core, however, the structural members 40 may be utilized in any embodiment, regardless of the particular construction of the core.

Importantly, the structural member 40 around the outside of the foam core 12 provides a rigid structure to resist curling (bending) of the cover under a large thermal gradient, particularly in cold weather. In particular, existing spa covers can be prone to curling or bending, particularly at the corners, in cold weather (due to the different in temperature between the heated water within the spa and cold ambient temperatures outside the spa). When this happens, the corners of the cover can curl up and away from the spa, causing steam to leak from the openings that are created and creating a loss of energy from the water in the spa. This lowers the temperature of the spa water requiring the heater to activate and reheat the water. The structural member 40, however, inhibits curling or bending at the corners, ensuring that a tight seal is maintained between the cover and the spa at all points, preventing and/or minimizing heat leakage. In addition, the polyurethane and urethane materials used herein (e.g., the water impermeable coating, material of the core and/or the adhesive that bonds the core to the hard outer shell (where utilized) are thermal set plastics, which means after they set up, they cannot be melted again. This property makes them ideal for resisting the high temperatures that can result on the surface of the cover from direct exposure to sunlight in warm climates.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method of manufacturing a cover for a spa, comprising the steps of:

forming a solid block of expanded polystyrene into the shape of a spa cover and defining a core; and via spray coating, coating the core with a hydrophobic coating;

coating interior surfaces of a rigid top shell member with an adhesive, the rigid top shell member defining a cavity; and inserting the core into the cavity such that the rigid top shell member forms a top of the cover and the core forms an underside of the cover.

2. The method according to claim 1, wherein:

the hydrophobic coating is a pure urea elastomer coating.

3. The method according to claim 1, wherein:

the coating is a two part spray polyurethane coating.

4. The method according to claim 1, further comprising the step of:

bringing the top shell member and the bottom shell member into nesting relationship to enclose the core.

5. A cover for a spa, comprising:

a core;

a hydrophobic spray coating encasing the core; and a hard shell encasing the core and coating;

wherein the hydrophobic spray coating is one of a pure urea elastomer coating and a polyurethane coating applied to a thickness of 0.015 to 0.030 inches to seal the foam core from moisture intrusion;

wherein the core is bonded to the hard shell via an adhesive.

6. The cover of claim 5, further comprising:

a structural member embedded in the core and extending along a perimeter of the core, the structural member being configured to inhibit bending of the core due to thermal gradients.

7. The cover of claim 5, wherein:

the adhesive is a urethane adhesive.

* * * * *